(12) United States Patent
Wright

(10) Patent No.: US 8,253,307 B2
(45) Date of Patent: Aug. 28, 2012

(54) CIRCUITS FOR HARVESTING ENERGY FROM PIEZOELECTRIC DEVICES

(75) Inventor: David D. Wright, Grantham, NH (US)

(73) Assignee: Par Technologies, LLC, Washington, DC (US)

( * ) Notice: Subject to any disclaimer, the term of this patent is extended or adjusted under 35 U.S.C. 154(b) by 590 days.

(21) Appl. No.: 12/402,457

(22) Filed: Mar. 11, 2009

(65) Prior Publication Data

US 2009/0230924 A1    Sep. 17, 2009

Related U.S. Application Data

(60) Provisional application No. 61/035,610, filed on Mar. 11, 2008.

(51) Int. Cl.
  *H01L 41/08* (2006.01)
  *H02N 2/18* (2006.01)
(52) U.S. Cl. .......................... 310/339; 310/319
(58) Field of Classification Search ............ 310/319, 310/338, 339; 320/148; *H01L 41/08*
  See application file for complete search history.

(56) References Cited

U.S. PATENT DOCUMENTS

| 5,245,242 | A | * | 9/1993 | Hall | 310/316.03 |
| 5,703,474 | A | * | 12/1997 | Smalser | 310/318 |
| 5,801,475 | A | * | 9/1998 | Kimura | 310/339 |
| 6,407,484 | B1 | * | 6/2002 | Oliver et al. | 310/339 |
| 6,580,177 | B1 | * | 6/2003 | Hagood et al. | 290/1 R |

FOREIGN PATENT DOCUMENTS

| WO | 2005/046040 A2 | 5/2005 |
| WO | 2005/114826 A1 | 12/2005 |

OTHER PUBLICATIONS

International Search Report and Written Opinion mailed Oct. 15, 2009 in corresponding PCT application PCT/US2009/036859.
Ottman et al, "Adaptive Piezoelectric Energy Harvesting Circuit for Wireless Remote Power Supply", IEEE Trans Power Electronics, vol. 17, No. 5, Sep. 2002.
Torres et al, "Energy-Harvesting Chips: The Quest for Everlasting Life", IEEE Georgia Tech Analog and Power IC Design Lab, Power Management DesignLine, Jun. 30, 2005.
Lesieutre et al, "Piezoelectric Energy Harvesting for Vibration Control, Wireless Sensor Networks, and Resource Conservation", Penn State Engineered Adaptive Structures V. Maiori, Italy, Jun. 19-23, 2006.

* cited by examiner

*Primary Examiner* — Thomas Dougherty
*Assistant Examiner* — Karen B Addison
(74) *Attorney, Agent, or Firm* — Nixon & Vanderhye, P.C.

(57) ABSTRACT

Circuits (20, 220, 320, 420) are provided for applying electrical charge collected from a piezoelectric device (22) to a charge storage device (24, 224, 424). The circuits comprise a peak detector (32, 232) and a switch(es) (34, 134, 234, 434) which is/are operated to initiate transfer of the electrical charge from the piezoelectric device to the charge storage device upon detection by the peak detector (32, 232) of a peak voltage across the piezoelectric device (22). In an example embodiment, the peak detector (32, 232) comprises a peak-detection capacitance (C4); a gain element (42, 242); and a non-linear PN junction circuit (40). The circuits can also comprise charge multiplier circuit (300) configured to continue application of the electrical charge to the charge storage device (224) after the switch (262) has been turned off and/or after a point in time when magnitude of the voltage across the charge storage device (224) equals the magnitude of the voltage across the piezoelectric device (22).

21 Claims, 7 Drawing Sheets

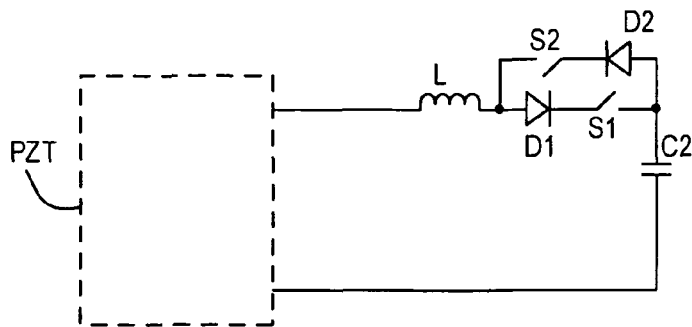
*Fig. 7*
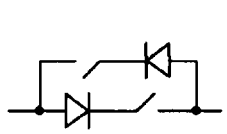 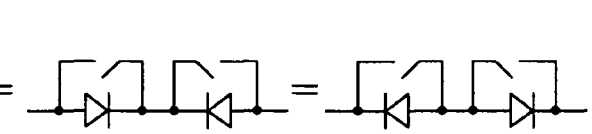 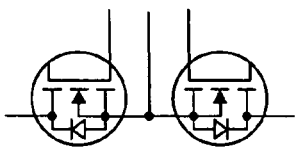
*Fig. 8A*   *Fig. 8B*   *Fig. 8C*   *Fig. 8D*
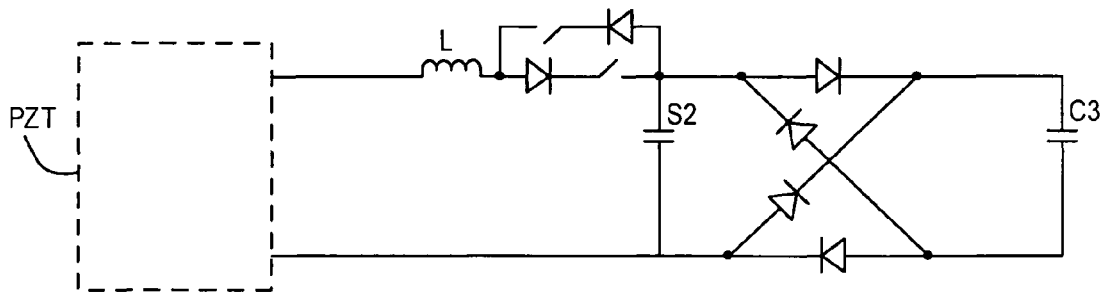
*Fig. 9*
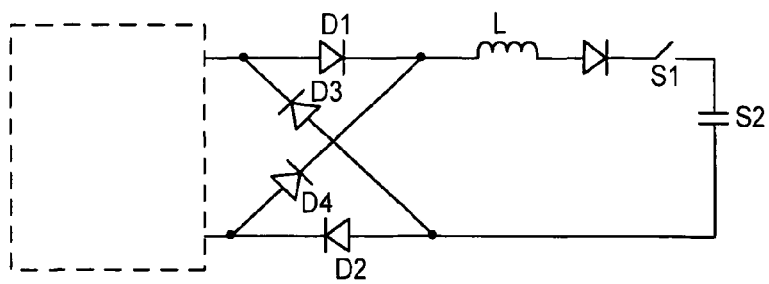
*Fig. 10*

CIRCUITS FOR HARVESTING ENERGY FROM PIEZOELECTRIC DEVICES

This application claims the priority and benefit of U.S. provisional patent application 61/035,610, filed Mar. 11, 2008, entitled "Active Energy Extraction Circuit for Energy Harvesting", which is incorporated herein by reference in its entirety.

BACKGROUND

I. Technical Field

This invention pertains to the harvesting or recycling of energy, and particularly energy harvesting in apparatus which involve or comprise piezoelectric element(s).

II. Related Art and Other Considerations

A piezoelectric element is essentially a parallel plate capacitor with a dielectric material between the plates (the piezoceramic). As the piezoceramic material is strained, a charge builds up on the electrodes (plates). The strain on the piezoelectric material can result from various factors, such as vibration or even change of temperature (heating and cooling) of the piezoelectric material.

If the goal is to achieve the maximum energy transfer from a piezogenerator, then it is desirable to remove energy from the piezogenerator when the output voltage reaches a peak and the charge on the electrodes of the piezogenerator is maximized. This is because energy is voltage multiplied by charge, so that maximum energy transfer will be achieved when energy is extracted from the capacitor (of piezogenerator) when voltage of the piezogenerator is at a maximum and the charge on the capacitor of the piezogenerator is at its peak.

The problem of efficiently extracting energy from a piezogenerator has been explored. To date most significant advances in performance have been achieved using circuits such as that of FIG. 1 or circuits that require an external source to power the circuit. In FIG. 1, a piezoelectric device is connected between the terminals IN. Voltage across the piezoelectric device is rectified by a diode bridge rectifier circuit to result in a single polarity voltage which is applied to a charge storage device (which is represented as capacitance C1 in FIG. 1). The circuit of FIG. 1 also includes means such as switch Q1, to turn off the charge storage device C1 when the voltage applied to C1 is too small to be useful (since some devices might continue to draw power even though they cannot do anything and never turn off).

BRIEF SUMMARY

The technology disclosed herein concerns circuits for applying electrical charge collected from a piezoelectric device to a charge storage device. The circuits are of a type which comprise a peak detector and a switch is operated to initiate transfer of the electrical charge from the piezoelectric device to the charge storage device upon detection by the peak detector of a peak voltage across the piezoelectric device.

In one its aspects, the technology disclosed herein particularly concerns the peak detector which detects the peak voltage across the piezoelectric device. In an example embodiment, the peak detector comprises a peak-detection capacitance and a non-linear PN junction circuit. The peak-detection capacitance is charged by voltage across the piezoelectric device until the voltage across the piezoelectric device reaches the peak voltage across the piezoelectric device. The non-linear PN junction circuit is connected in series with the peak-detection capacitance and turns off the switch while the peak-detection capacitance is charging and turns on the switch substantially upon detection of the peak voltage (e.g., while the peak-detection capacitance is discharging).

In an example implementation the peak detector further comprises a gain element. In such embodiment, the non-linear PN junction circuit is configured to turn off the gain element and thereby turn off the switch while the peak-detection capacitance is charging, but to turn on the gain element and thereby turn on the switch substantially upon detection of the peak voltage. In some example implementations, the gain element comprises one of a field effect transistor and an operational amplifier.

In an example implementation, the peak-detection capacitance has a value in a range from 50 picoFarads to 200 picoFarads.

In example implementations, the non-linear PN junction circuit comprises a first diode connected in parallel with a second diode. The first diode has a positive voltage thereacross when the peak-detection capacitance is charging for turning off the switch. The second diode is configured to turn on the switch when the peak-detection capacitance is discharging.

In differing example implementations, the switch can comprise a field effect transistor; a flip-flop connected to a field effect transistor; an optical TRIAC connected to the charge storage device; or, a silicon controlled rectifier (SCR) connected to the charge storage device.

In another of its aspects, the technology disclosed herein particularly concerns energy harvesting circuits further comprising a charge multiplier circuit configured to continue application of the electrical charge to the charge storage device after the switch has been turned off and/or after a point in time when magnitude of the voltage across the charge storage device equals the magnitude of the voltage across the piezoelectric device.

In an example embodiment, the charge multiplier circuit comprises an inductance connected in series with the charge storage device; and a free wheeling diode connected in parallel with a series connection of the inductance and the charge storage device.

In an example embodiment, the charge multiplier circuit is configured whereby electrical charge stored by the charge storage device is a multiple by a factor M of the peak voltage across the piezoelectric device, wherein M is substantially a ratio of the peak voltage across the piezoelectric device to the voltage across the charge storage device at the time of the peak voltage across the piezoelectric device.

In another of its aspects, the technology disclosed herein particularly concerns energy harvesting circuits which are capable of bi-directional collection of charge, e.g., collecting charge at a time when the charge on a piezoelectric device either reaches a positive voltage peak or a negative voltage peak. In such embodiments, the circuits comprise a detector configured to detect both a positive peak voltage and a negative voltage peak across the piezoelectric device as well as switching means. The switching means can be configured to initiate transfer of the electrical charge from the piezoelectric device to the charge storage device upon detection of the positive peak voltage across the piezoelectric device, and to initiate transfer of the electrical charge from the piezoelectric device to the charge storage device upon detection of the negative peak voltage across the piezoelectric device.

In another of its aspects, the technology disclosed herein particularly concerns energy harvesting circuits which both (1) provide bidirectional control of energy flow for causing charge on the piezoelectric device to go through an increased potential difference and thereby provide increased voltage on the piezoelectric device, and (2) collect the increased charge from the piezoelectric device in an energy storage device.

In some embodiments the circuits described herein can further optionally comprise a tap circuit configured to extract a portion of voltage across the piezoelectric device to operate at least one of the peak detector and the switch.

In some embodiments the circuits described herein can further optionally comprise a rectifier connected to the piezoelectric device and configured to provide a single polarity voltage as the voltage across the piezoelectric device.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is a schematic view of an example embodiment of a basic energy extractor circuit.

FIG. 8A-FIG. 8D are schematic views of differing bidirectional switches.

FIG. 9 is a schematic view of an example embodiment of an energy extraction circuit suitable for bi-directional collection and having a diode bridge output.

FIG. 10 is a schematic view of an example embodiment of an energy extraction circuit suitable for unidirectional collection and having an internal diode bridge.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
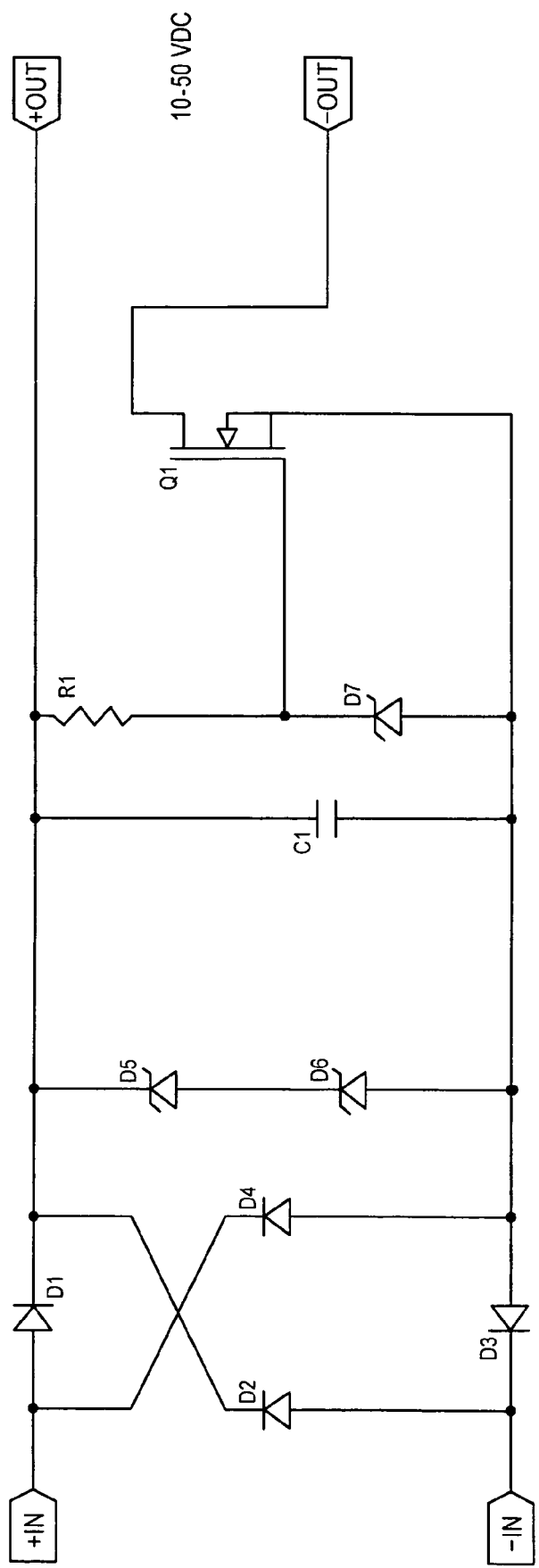
FIG. 1 is a schematic view of a state of the art energy harvesting circuit.
Figure 2:
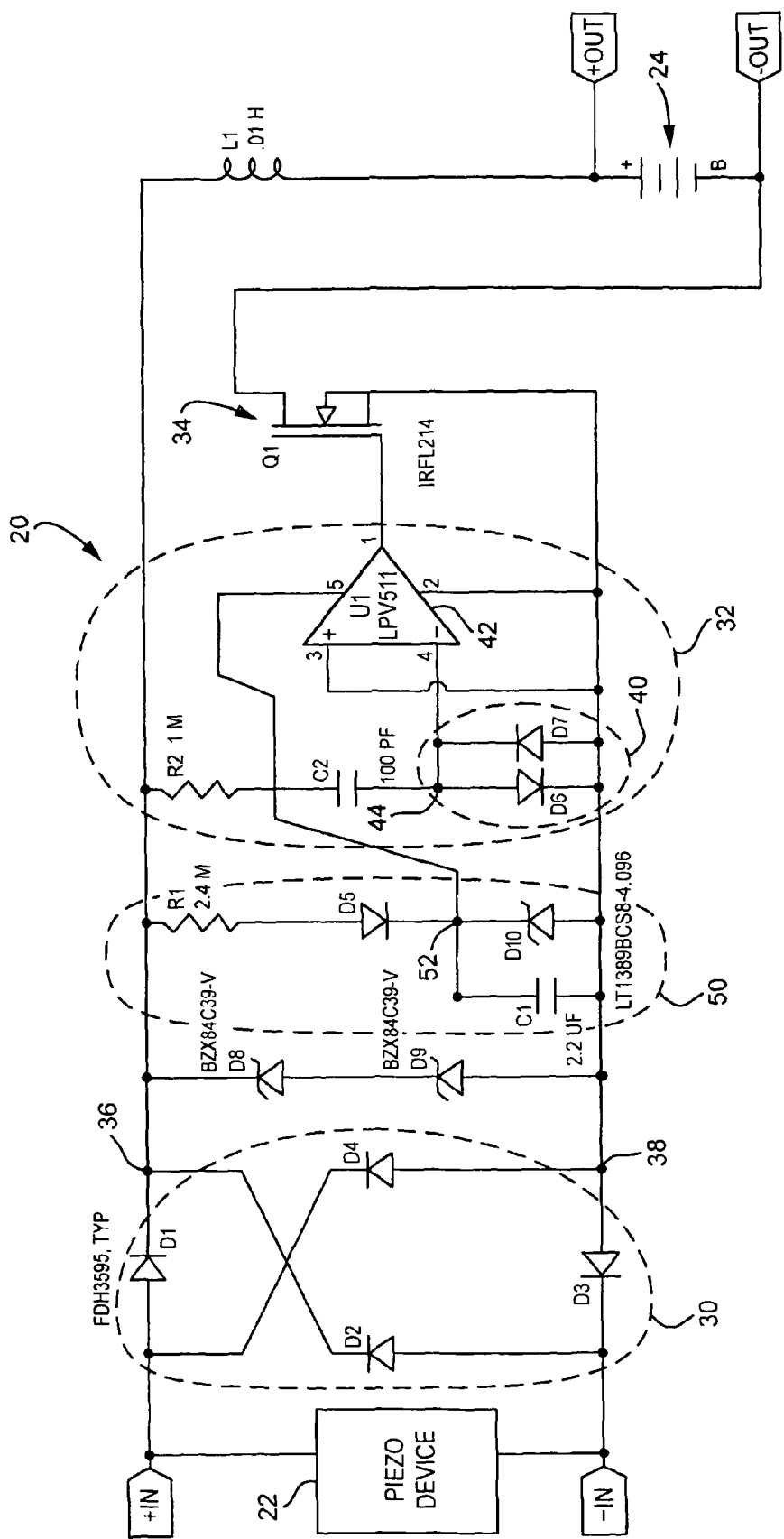
FIG. 2 is a schematic view of an energy harvesting circuit for use in a piezoelectric energy harvesting device according to a first example embodiment.

Energy harvesting circuit 20 of FIG. 2 is utilized to apply electrical charge collected from a piezoelectric device 22 to a collector, such as charge storage device 24. The piezoelectric device 22 can be any type of piezoelectric element or piezogenerator which produces a voltage or charge (e.g., on electrodes or plates of the piezoelectric device) when the piezoelectric material experiences or undergoes a strain, as previously mentioned. The charge storage device 24 can be any device capable of collecting or storing a charge, two prime but non-exhaustive examples being batteries or capacitances. While the example embodiment of FIG. 2 happens to show charge storage device 24 as being a battery, other example embodiments described herein show charge storage device 24 as being a capacitance. The differing types of charge storage device 24 are interchangeable among the embodiments encompassed hereby.

Energy harvesting circuit 20 of FIG. 2 generally comprises rectifier 30; peak detector 32; inductance L1; and, switch 34. Rectifier 30 is connected between two electrodes of piezoelectric device 22. Rectifier 30 takes the AC voltage produced by the cyclic loading of piezoelectric device 22 and converts it to a DC signal (single polarity voltage signal) which is further processed and harvested by energy harvesting circuit 20. Rectifier 30 is needed if the signal applied to circuit 20 has a negative voltage component. If a device were connected to circuit 20 which did not present a negative voltage component, rectifier 30 would not be required. As illustrated in FIG. 2, rectifier 30 comprises a diode bridge comprising diodes D1, D2, D3, and D4.

Nodes 36 and 38 of energy harvesting circuit 20 correspond to a high voltage rail and a low voltage rail, respectively, of energy harvesting circuit 20. The peak detector 32 is connected between the high and low voltage rails, as is a series connection of Zener diodes D8 and D9.

The peak detector 32 comprises resistance R2; peak-detection capacitance C2; non-linear PN junction circuit 40; and gain element 42. As shown in FIG. 2, resistance R2, peak-detection capacitance C2, and non-linear PN junction circuit 40 are connected in series between node 36 and node 38. In the particular implementation of FIG. 2, non-linear PN junction circuit 40 comprises a pair of diodes, e.g., diode D6 and diode D7. The diode D6 and diode D7 are connected in parallel with one another between peak-detection capacitance C2 and node 38. A node 44 between non-linear PN junction circuit 40 and peak-detection capacitance C2 is connected to a second input terminal (pin 4) of gain element 42. The peak-detection capacitance C2 and diode D6 are connected through node 38 to a first input terminal (pin 3) of gain element 42. An output pin (pin 1) of gain element 42 is connected to switch 34. In the illustrated example of FIG. 2, peak-detection capacitance C2 has a value of 100 picoFarads (pF) and gain element 42 takes the form of an operational amplifier.

The switch 34 of FIG. 2 takes the example form of a MOSFET (Metal Oxide Semiconductor Field Effect Transistor). The output pin of gain element 42 is connected to a source of the MOSFET switch 34; the gate of MOSFET switch 34 is connected to node 38; the drain of MOSFET switch 34 is connected to node 36 through a series connection of inductance L1 and charge storage device 24.

In the illustrated example, the value of inductance L1 is on the order of 0.01 Henries. However, significantly different values of inductance can be utilized depending on various considerations. For example, lower inductance values involves a higher current over a shorter time which tends to increase joule heating losses, but the for a lower inductance value the inductor itself is smaller (typically) and the circuit may be more practical.

The energy harvesting circuit 20 of FIG. 2 also comprises tap circuit 50 which is configured to extract a portion of voltage across the piezoelectric device 22 to operate, e.g., peak detector 32. The tap circuit 50 comprises resistance R1; diode D5; capacitance C1; and Zener diode D10. A first terminal of resistance R1 is connected to node 36; a second end of resistance R1 is connected to anode of diode D5; the cathode of diode D5 is connected to node 52; capacitance C1 and Zener diode D10 are connected in parallel between node 52 and node 38. Node 52 is also connected to pin 5 of gain element 42, with pin 2 of gain element 42 being connected to node 38.

In operation, piezoelectric device 22 is connected at the lead positions marked +IN and −IN to energy harvesting circuit 20 of FIG. 2 and produces a time varying signal which is rectified by diodes D1-D4 of rectifier 30 to produce a single polarity voltage at node 36. Zener diode D8 and D9 limit the peak voltage to protect components in the circuit. The tap circuit 50 taps a portion of the single polarity voltage to operate the control electronics, e.g., to produce the 4 volts nominal voltage used to power the control elements such as peak detector 32.

As indicated above, peak detector 32 is comprised of resistance R2, peak-detection capacitance C2, non-linear PN junction circuit 40 (comprising diode D6 and diode D7), and gain element 42. The gain element 42 can be an amplifier or a low power operational amplifier.

When the peak voltage is still arriving from piezoelectric device 22, peak-detection capacitance C2 is still able to charge further through resistor R2. Since peak-detection capacitance C2 is charging, current is flowing through D6 and there is a positive voltage across D6. Thus pin 4 of gain element 42, to which peak-detection capacitance C2 is connected, sees a voltage greater than zero, so that a logic low is output from pin 1 of gain element 42. The logic low from gain element 42 is applied to the source of MOSFET switch 34, and keeping MOSFET switch 34 off.

Once the peak voltage of piezoelectric device 22 is reached (e.g., the voltage no longer increases), the current through D6 drops to zero as does the voltage at pin 3 of gain element 42. The diode D7 supplies a current return path for the discharge of peak-detection capacitance C2. At peak voltage of piezoelectric device 22 the pin 4 of gain element 42 goes below zero, so that a logic high is output from pin 1 of gain element 42. The logic high from gain element 42 is applied to the source of MOSFET switch 34, and turning on MOSFET switch 34.

It will be appreciated that, in all embodiments described herein, detection of the peak voltage and operation of the switch to permit charging of the charge storage device may not be immediate, for which reason it is said and understood that the peak detector and its peak-detection capacitance turns on the switch "substantially" upon detection of the peak voltage. In this regard, "substantially" takes into consideration such factors as time needed for current to begin to flow through diode D7 and phase angles affected by RC time constants.

At the peak voltage of piezoelectric device 22, pin 1 of U2 goes to logic high, turning on MOSFET switch 34 in order to charge the charge storage device 24 through inductor L1. The MOSFET switch 34 stays on until all the charge in inductance L1 decays to zero, and all that charge therefore has to flow into charge storage device 24.

Figure 3:
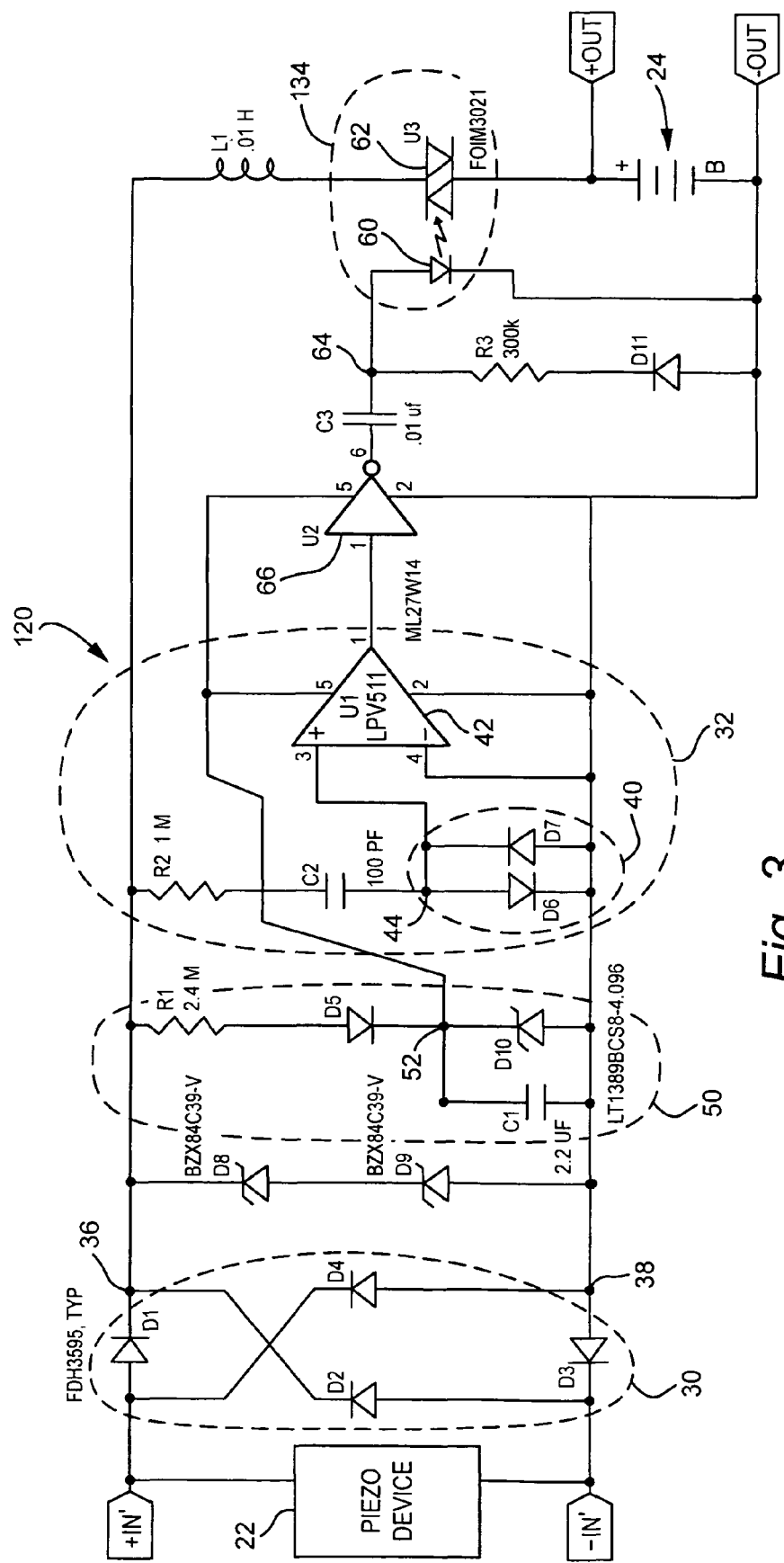
FIG. 3 is a schematic view of an energy harvesting circuit for use in a piezoelectric energy harvesting device according to a second example embodiment.

In further example embodiments of energy harvesting circuits described herein, similar elements are referenced with like numbered components. For example, the energy harvesting circuit 120 of the example embodiment of FIG. 3 generally resembles energy harvesting circuit 20 of FIG. 2, excepting essentially the type of switch employed and additional elements connected between the switch and peak detector 32. In particular, the switch of energy harvesting circuit 120 of FIG. 3 takes the form of an optically coupled TRIAC switch 234. The optically coupled TRIAC switch 234 comprises a light emitting element such as light emitting diode 60 and optically controlled switch 62. The optically controlled switch 62 is connected in series between inductance L1 and charge storage device 24. The anode of light emitting diode 60 is connected to node 64, the cathode of light emitting diode 60 is connected to node 38. Resistance R3 and diode D11 are connected in series between node 64 and node 38, and thus in parallel to light emitting diode 60. The output of gain element 42 is connected to an input pin of inverter 66, whose inverted output is applied to capacitance C3 which is connected between inverter 66 and node 64.

In the operation of energy harvesting circuit 120, peak detector 32 and peak-detection capacitance C2 operate in essentially similar manner to the comparable elements of energy harvesting circuit 20 of FIG. 2. For example, when peak-detection capacitance C2 is charging, current is flowing through D6 and there is a positive voltage across D6. Thus pin 3 of gain element 42 sees a high voltage (above zero), so that a logic high is output from pin 1 of gain element 42. The logic high from gain element 42 is applied to inverter 66, which outputs a logic low to the anode of light emitting diode 60 of optically coupled TRIAC switch 234. Absence of light from light emitting diode 60 turns of optically controlled switch 62, which in turns precludes charge storage device 24 from charging.

Once the peak voltage of piezoelectric device 22 is reached (e.g., the voltage no longer increases), the current through D6 drops to zero and a low voltage (below zero) is applied to pin 3 of gain element 42. The diode D7 supplies a current return path for the discharge of peak-detection capacitance C2. At peak voltage of piezoelectric device 22 pin 3 of gain element 42 thus sees a low signal, so that a logic low is output from pin 1 of gain element 42. The logic low from gain element 42 is applied to inverter 66, which outputs a logic high to the anode of light emitting diode 60, so that light emitting diode 60 conducts. Light from light emitting diode 60 incident on optically controlled switch 62 turns on the optically controlled switch 62 in order to charge the charge storage device 24 through inductor L1. The optically coupled TRIAC switch 234 stays on until all the charge in inductance L1 decays to zero, and all that charge therefore has to flow into charge storage device 24.

Figure 4:
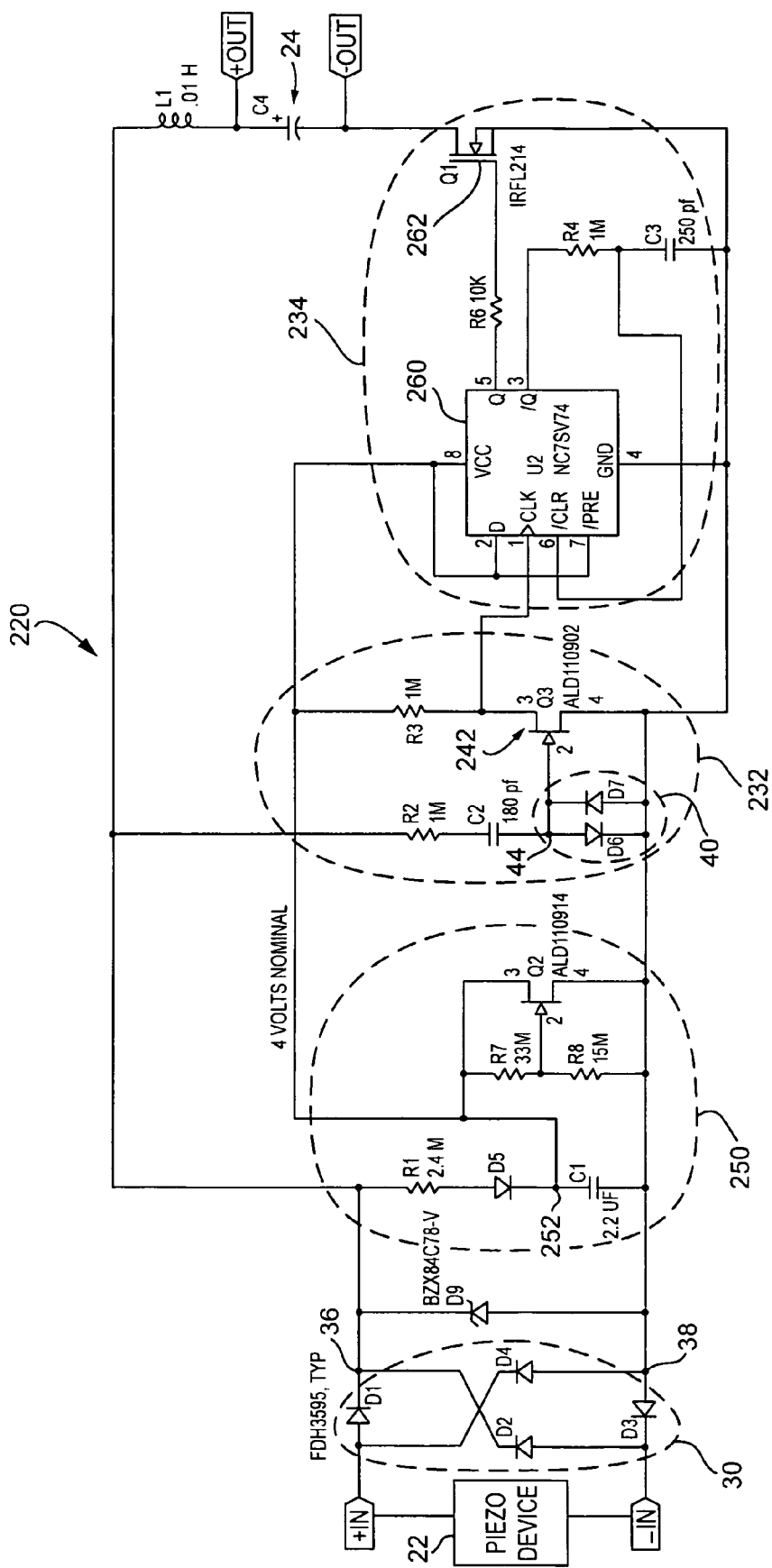
FIG. 4 is a schematic view of an energy harvesting circuit for use in a piezoelectric energy harvesting device according to a third example embodiment.

In differing respects, the energy harvesting circuit 220 of FIG. 4 both resembles and differs from the energy harvesting circuits of the previous embodiments. One difference is that FIG. 4 shows energy harvesting circuit 220 has charging a capacitance C4, which serves as the charge storage device 224. As mentioned before, capacitances and batteries and other charge storage devices can be used interchangeably, so that it should be understood that in FIG. 4 and other figures a battery can be utilized instead of a capacitance.

The energy harvesting circuit 220 generally comprises rectifier 30; peak detector 232; inductance L1; and, switch 234. As in the preceding embodiments, rectifier 30 is connected between two electrodes of piezoelectric device 22; comprises diodes D1-D4; and functions in similar manner to the preceding embodiments. Likewise, nodes 36 and 38 of energy harvesting circuit 20 correspond to a high voltage rail and a low voltage rail, respectively, of energy harvesting circuit 120. The peak detector 232 is connected between the high and low voltage rails, as is Zener diode D9.

The peak detector 232 comprises resistance R2; peak-detection capacitance C2; non-linear PN junction circuit 40; and gain element 242. As shown in FIG. 4, resistance R2, peak-detection capacitance C2, and non-linear PN junction circuit 40 are connected in series between node 36 and node 38. The FIG. 4 implementation of non-linear PN junction circuit 40 also particularly comprises a pair of diodes, e.g., diode D6 and diode D7, connected in parallel with one another between peak-detection capacitance C2 and node 38. A node 44 between non-linear PN junction circuit 40 and peak-detection capacitance C2 is connected to a first terminal (pin 2) of gain element 242. An output terminal (pin 3) of gain element 242 is connected to switch 234 and through resistance R3 to tap circuit 250. In the illustrated example of FIG. 4, peak-detection capacitance C2 has a value of 180 picoFarads (pF) and gain element 242 takes the form of a field effect transistor (FET).

The tap circuit 250 of FIG. 4 comprises resistance R1, diode D5, capacitance C1, resistance R7, resistance R8, and switch (FET) Q2. The resistance R1 is connected between node 36 and the anode of diode D5. The cathode of diode D5 is connected to node 252. Capacitance C1 is connected between node 252 and node 38. Node 252 is connected to switch 234; through resistance R3 to pin 3 of gain element 242; and to pin 3 of switch (FET) Q2. Resistance R7 and resistance R8 are connected in series between node 252 and node 38. The node between resistance R7 and resistance R8 is connected to the gate (pin 2) of switch (FET) Q2. Pin 4 of switch (FET) Q2 is connected to node 38.

The switch 234 of FIG. 4 takes the example form of a flip-flop 260 and a MOSFET 262, with the Q output terminal of the flip-flop 260 being connected through resistance R6 to the source of MOSFET (Metal Oxide Semiconductor Field Effect Transistor) 262. The D input pin, the VCC input pin (pin 8), and pin 7 (/PRE) of flip-flop 260 are connected to node 252 of tap circuit 250. The ground pin (pin 4) of flip-flop 260 is connected to node 38. The clock (CLK) pin (pin 1) of flip-flop 260 is connected to the drain (pin 3) of gain element 242. The source and gate of MOSFET 262 are connected to node 38. The /Q pin (pin 3) of flip-flop 260 is connected through the series combination of resistance R4 and capacitance C3 to node 38. The clear (/CLR) pin (pin 6) of flip-flop 260 is connected to a node between resistance R4 and capacitance C3.

As in previous embodiments, piezoelectric device 22 is connected at the lead positions marked +IN and −IN and produces a time varying signal which is rectified by rectifier 30 to produce a single polarity voltage at node 36 (e.g., the node of resistance R1, diode D9, and inductance L1. Zener diode D9 limits the peak voltage to protect components in energy harvesting circuit 220. The tap circuit 250 serves to tap a portion of the single polarity voltage to operate the control electronics, e.g., to provide a 4 volts nominal voltage to gain element 242 of peak detector 232 and flip-flop 260 of switch 234.

As indicated above, peak detector 232 comprises resistance R2, peak-detection capacitance C2, non-linear PN junction circuit 40, and gain element 242. In the example illustrated embodiment of FIG. 4, non-linear PN junction circuit 40 particularly comprises diode D6 and diode D7 and gain element 242 (Q3) is in the form of an amplifier (although other elements such as a low power op amp could also be used).

When the peak voltage from piezoelectric device 22 is still arriving, capacitor C2 is still able to charge further through resistor R2. Since the peak-detection capacitance C2 is charging, current is flowing through D6 and there is a positive voltage across D6. Thus the gate of gain element 242 (Q3) sees a positive voltage and gain element 242 conducts, keeping the voltage at pin 1 of flip-flop 260 at a logic low. With the voltage at pin 1 of flip-flop 260 at a logic low, the output at Q pin 5 of flip-flop 260 is also low, so that MOSFET switch (Q1) 262 is off and accordingly charge does not flow into charge storage device 224 (capacitance C4).

Once the peak voltage for piezoelectric device 22 is reached and the voltage from piezoelectric device 22 no longer increases, the current through diode D6 drops to zero as does the voltage at the gate of gain element 242 (Q3). Thus, after the peak voltage across piezoelectric device 22 has been reached, gain element 242 (Q3) stops conducting and the voltage at pin 1 of flip-flop 260 becomes a logic one due to the signal applied through R3 to pin 1. The diode D7 serves to supply a current return path for the discharge of peak-detection capacitance C2. In other words, after the peak of the single polarity voltage across piezoelectric device 22, the voltage on peak-detection capacitance C2 starts to decrease and current flows through diode D7, which in turn draws the voltage at pin 2 of gain element 242 (Q3) negative, so that gain element 242 (Q3) remains turned off.

As mentioned above, at the peak voltage across piezoelectric device 22, pin 1 of flip-flop 260 (U2) goes to logic one. In response, the output at pin Q of flip-flop 260 goes high, thereby turning on MOSFET switch (Q1) 262 to charge the output capacitor C4 (e.g., charge storage device 224) through inductor L1. While MOSFET switch (Q1) 262 stays on, the charge in inductance L1 flows into charge storage device 224 (capacitance C4).

Once turned on, for the example embodiment of FIG. 4 the MOSFET switch (Q1) 262 needs to be turned off. It is advantageous to turn off the MOSFET switch (Q1) at or about the time the voltage on charge storage device 224 (capacitance C4) is equal to the voltage across piezoelectric device 22. When so doing, in the energy harvesting circuit 220 of FIG. 4 it is possible to store in charge storage device 224 a charge that is essentially twice or double the charge on piezoelectric device 22, e.g, the charge on the original capacitor.

The flip flop circuit of flip-flop 260 (U2) is configured as a monostable multivibrator in order to turn off MOSFET switch (Q1) 262. That is, when pin Q of flip-flop 260 goes high, its complementary output (pin /Q) goes low. After a brief time period during which capacitance C3 discharges, pin 6 (/CLR) of flip-flop 260 achieves a logic low and the flip flop is reset to await the next voltage peak.

Figure 5:
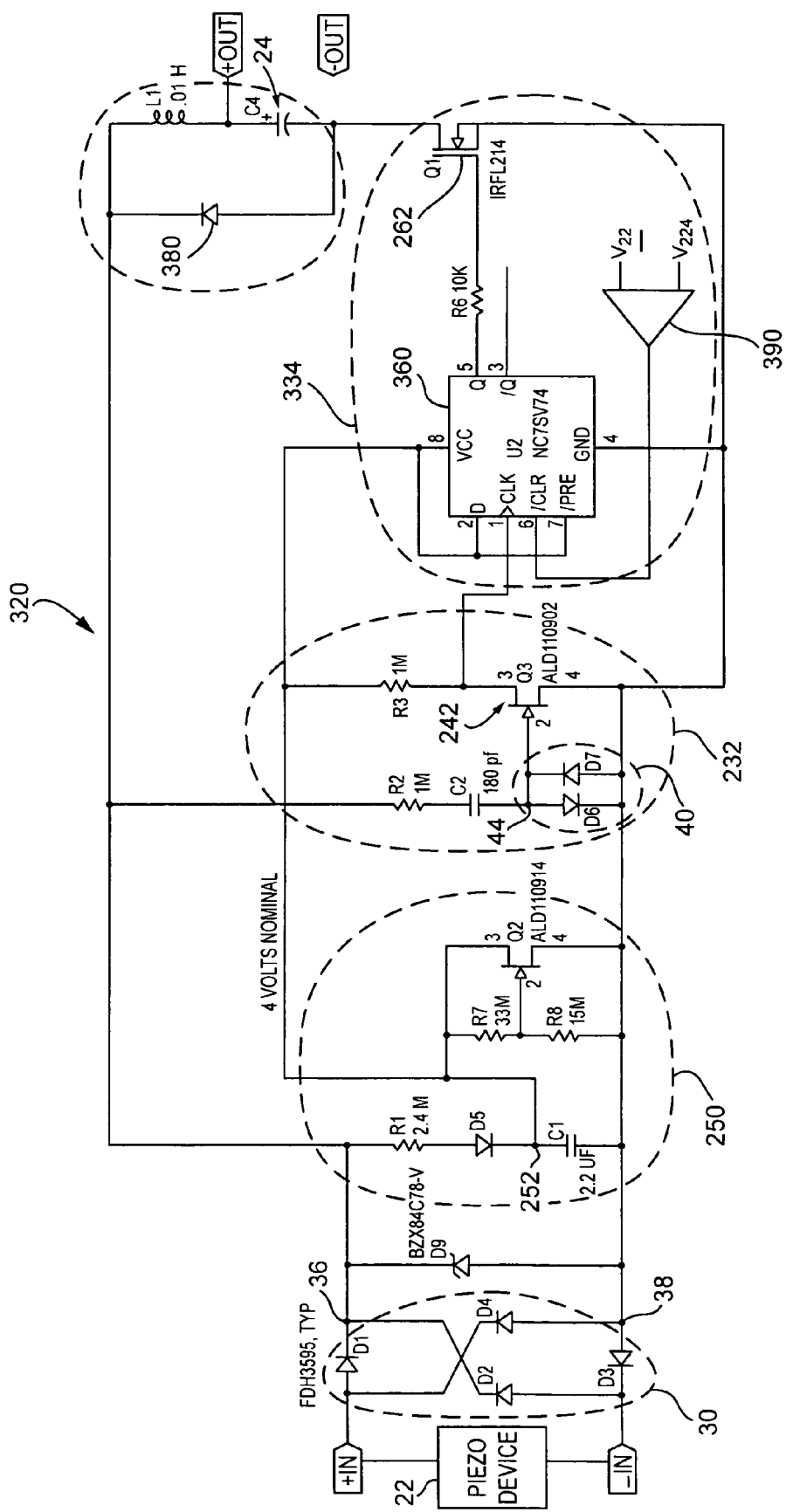
FIG. 5 is a schematic view of an energy harvesting circuit for use in a piezoelectric energy harvesting device according to a fourth example embodiment.

Energy harvesting circuit 320 of FIG. 5 essentially resembles energy harvesting circuit 320 of FIG. 4, with primary exceptions being addition of charge multiplier circuit 300 and various connections to flip-flop 260 and of its switch 334 in view of the addition of the charge multiplier circuit 300. Thus, as with one or more other energy harvesting circuits described herein, the energy harvesting circuit 320 of FIG. 5 comprises rectifier 30, peak detector 232, inductance L1, and tap circuit 250. The switch 334 of energy harvesting circuit 320 comprises flip-flop 360 and MOSFET switch (Q1) 262. As mentioned above, in view of the addition of charge multiplier circuit 300, the connection of various pins of flip-flop 360 differ from the flip-flop 260 of the FIG. 4 embodiment.

The charge multiplier circuit 300 of the energy harvesting circuit 320 of FIG. 5 is configured to continue application of the electrical charge to the charge storage device 224 (e.g., capacitance C4) after MOSFET switch (Q1) 262 has been turned off and/or after a point in time when magnitude of the voltage across the charge storage device 224 equals the magnitude of the voltage across the piezoelectric device 22. In the example embodiment illustrated in FIG. 5, the charge multiplier circuit 300 comprises the inductance L1 connected in series with charge storage device 224 (capacitance C4), with a free wheeling diode 380 (D8) being connected in parallel to a series connection of inductance L1 and charge storage device 224.

Except for operation of charge multiplier circuit 300, operation of the energy harvesting circuit 320 of FIG. 5 essentially resembles operation of energy harvesting circuit 220 of FIG. 4. For example, while peak-detection capacitance C2 of peak detector 232 is still charging, MOSFET switch (Q1) 262 is turned off, so that charge does not accumulate in charge storage device 224. However, when the peak voltage occurs across piezoelectric device 22, peak-detection capacitance C2 stops charging, and with the peak voltage having been detected by peak detector 232, the MOSFET switch (Q1) 262 is turned on. The turning on of MOSFET switch (Q1) 262 initiates the flow of current from inductance L1 for charging of charge storage device 224.

Unlike the energy harvesting circuit 220 of the embodiment of FIG. 4, in the energy harvesting circuit 320 of FIG. 5 the charging of charge storage device 224 (capacitance C4) does not stop when MOSFET switch (Q1) 262 turns off. Rather, the charge multiplier circuit 300 continues application of the electrical charge to the charge storage device 224 (e.g., capacitance C4) after MOSFET switch (Q1) 262 has been turned off and/or after a point in time when magnitude of the voltage across the charge storage device 224 equals the magnitude of the voltage across the piezoelectric device 22.

In the above regard, free wheeling diode 380 (D8) delivers current to charge storage device 224 after MOSFET switch (Q1) 262 is turned off. Specifically, when MOSFET switch (Q1) 262 first turns on, the potential difference between the single polarity voltage (e.g., the voltage of piezoelectric device 22) and the voltage on charge storage device 224 induces current to build up in inductor L1. At this time no current flows through free wheeling diode 380 (D8) since free wheeling diode 380 is reversed biased. When this potential difference reaches zero, MOSFET switch (Q1) 262 is turned off. However, the current in inductance L1 is not zero, but rather is at a maximum. This current continues to flow through inductor L1, charge storage device 224 (capacitance C4), and free wheeling diode 380 until the action of the potential across inductance L1 is sufficient to halt the current. Thus, even after turn off of MOSFET switch (Q1) 262 this current which continues to flow through the three elements which comprise charge multiplier circuit 300 and continues to charge storage device 224 (capacitance C4), as in the manner of a buck mode power supply but with one triggering.

In other words, at the point when the charge on charge storage device 24 (capacitance C4) equals the charge on piezoelectric device 22, the magnetic field is no longer increasing on the inductance L1. But inductance L1 is at maximum current, and charge storage device 224 is still charging. As soon as MOSFET switch (Q1) 262 is turned off, current in inductance L1 starts to decrease. The current in inductance L1 flows through the loop of the three elements inductance L1, charge storage device 224, and free wheeling diode 380, which supplies the voltage across charge storage device 224, and applies that voltage across inductance L1 to slow down current flow through inductance L1. As current flow is reduced through inductance L1, charge is nevertheless produced across charge storage device 224.

In an example embodiment, the charge multiplier circuit 300 is configured so that electrical charge stored by the charge storage device 224 is a multiple by a factor M of the peak voltage across the piezoelectric device 22, wherein M is substantially a ratio of the peak voltage across the piezoelectric device 22 to the voltage across the charge storage device 224 at the time of the peak voltage across the piezoelectric device 22.

For example, suppose charge storage device 224 (capacitance C4) is a large capacitor, initially charged to 3 volts at the time of peak voltage across piezoelectric device 22, and the single polarity voltage (i.e., the peak voltage across piezoelectric device 22) is 30 volts when MOSFET switch (Q1) 262 is energized. The work done to build up the magnetic field is approximately 10 times as great as the voltage which collapses the field. Thus the current through the free wheeling diode 380 persists approximately ten times as long as it took to establish and about ten times as much charge is transferred to charge storage device 224 (capacitance C4) as would have been transferred by a circuit such as that of FIG. 4. This type of energy extraction is particularly useful when the excitation of piezoelectric device 22 is high and the "windfall" energy can be harvested efficiently.

In the example scenario of the preceding paragraph, the factor or multiplier M is substantially a ratio of the peak voltage across the piezoelectric device 22 (30 volts) to the voltage across the charge storage device 224 (3 volts) at the time of the peak voltage across the piezoelectric device 22. Thus, the factor or multiplier M is substantially 10:1, or 10. It is said the factor or multiplier M is "substantially" 10:1, or 10 in view of the fact that, with real elements, despite the peak voltage across piezoelectric device 22 being 30 volts, not all that 30 volts is pumping up the inductance L1, but rather 30 volts minus any voltage drop across the switch. For example, rather than having 30 volts, if the voltage drop elsewhere is about 3.5 volts, then instead it is about 26.5 volts which serve to increasing the current in inductance L1. And after the peak voltage, the backvoltage on inductance L1 which is trying to reduce the current is 3 volts on the charge storage device 224 plus the diode drop, so that one really has something like 26.5 volts rather than 30 volts, in which case the factor or multiplier is really about 8 rather than about 10. Therefore, in stating that the factor or multiple(r) is essentially a ratio of 10:1, it will be understood that not only the voltages across piezoelectric device 22 and charge storage device 224 at time of peak voltage need to be considered, but also the effects of voltage drops across the circuitry.

The provision of the charge multiplier circuit 300 of the energy harvesting circuit 320 of FIG. 5 thus can provide significantly increased charge storage on charge storage device 224. Whereas in the energy harvesting circuits of FIG. 2-FIG. 4 the charge stored on charge storage device 224 is about twice that of the charge on piezoelectric device 22, the uplink data period 330 of energy harvesting circuit 320 can provide a much greater (e.g., greater than twice) multiple of charge storage, such as a multiple that is substantially the ratio 10 as in the example scenario described above.

As mentioned above, when the potential difference between the single polarity voltage (e.g., the voltage of piezoelectric device 22) and the voltage on charge storage device 224 reaches zero, MOSFET switch (Q1) 262 should turned off. The turn off MOSFET switch (Q1) 262 can be accomplished in many ways. FIG. 5 shows an example wherein a comparator 390 is used to compare the single polarity voltage (e.g., the voltage of piezoelectric device 22) and the voltage on charge storage device 224 (capacitance C4), and to output a low signal to the /CLR pin(pin 6) of flip-flop 360 when the two input voltages to comparator 390 are equal. The low signal to the /CLR pin (pin 6) of flip-flop 360 turns off MOSFET switch (Q1) 262.

The non-linear PN junction circuits of the peak detectors described herein affords advantages over other configurations such as those configurations which use resistances. It is desirable for the peak-detection capacitance C2 of the peak detector 32 to have a relatively small capacitance value, and preferably a capacitance value in a range of from about 100 pF to about 400 pF. When the peak-detection capacitance C2 has a relatively small capacitance the peak detector 32 does not pull or absorb a lot of energy from energy harvesting circuit 20. If a resistance were to be utilized in conjunction with a capacitance in a peak detector, a fairly large capacitance must be utilized in order to get enough current through the resistance to sense the resistor current. But devices with non-linear PN junctions have a high voltage drop with small current, so that a small capacitance can be used for peak detection and yet there still be a reasonable voltage to operate a gain element such gain elements 42 and 242, for example.

Figure 6:
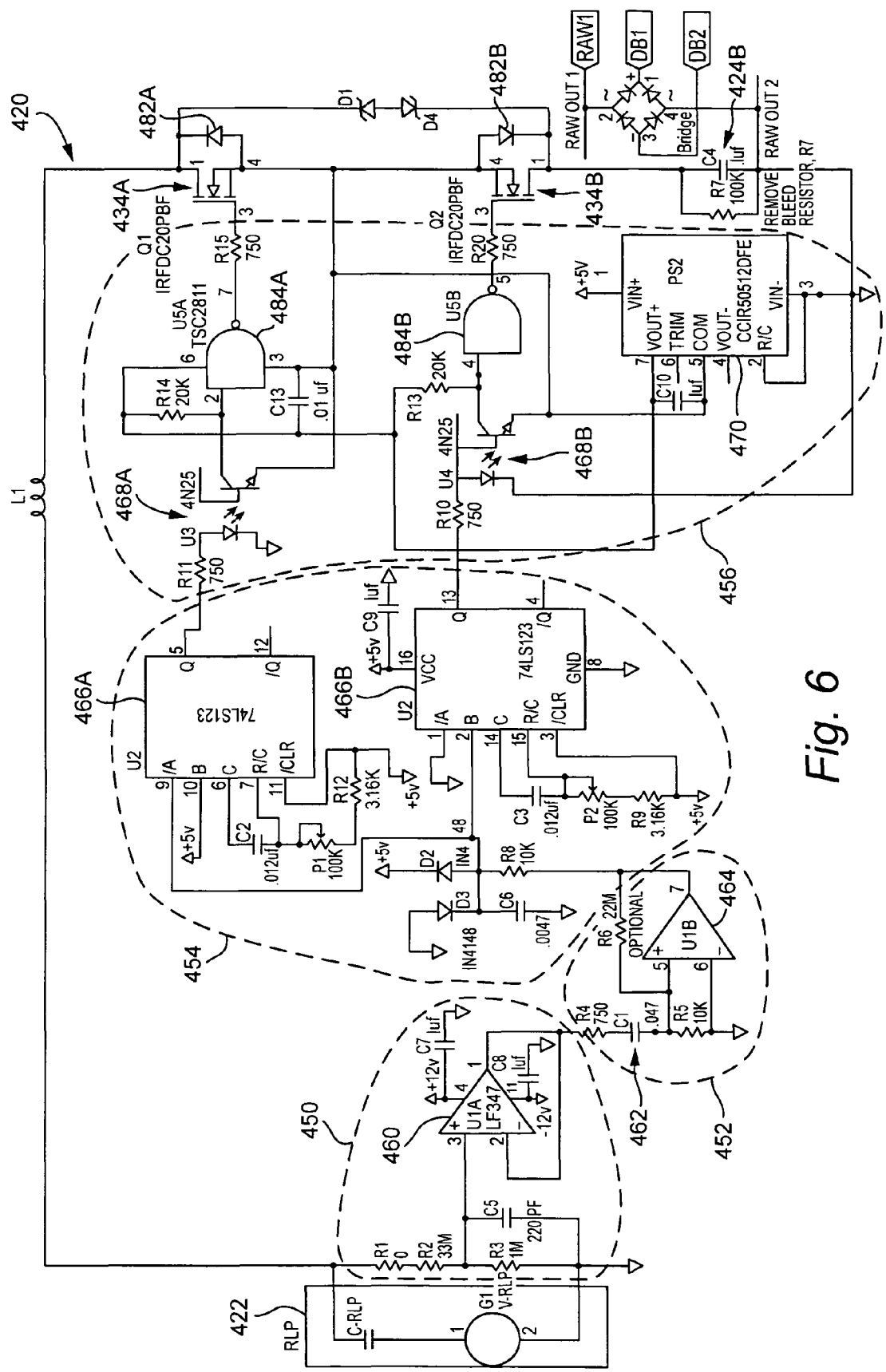
FIG. 6 is a schematic view of an energy harvesting circuit for use in a piezoelectric energy harvesting device according to a fifth example embodiment.

FIG. 6 shows energy harvesting circuit 420 according to yet another example embodiment. FIG. 6 particularly shows piezoelectric device 422 as comprising a piezoelectric capacitance C-RLP in series with a voltage source, G1, which supplies a voltage V-RLP. The energy harvesting circuit 420 of FIG. 6 serves to apply electrical charge collected from piezoelectric device 422 to charge storage device 424 (also illustrated as capacitance C4 in FIG. 6). The energy harvesting circuit 420 of FIG. 6 comprises inductance L1; switches 434; tap circuit 450; current direction detector 452; pulse forming circuit 454; and level shifted gate drive circuitry 456. As explained below, the energy harvesting circuit 420 of FIG. 6 is capable of bi-directional charge collection.

The tap circuit 450 comprises a resistive divider network (comprising resistors R1-R3 of FIG. 6) which senses the voltage across the piezoelectric device 422. The resistance is large enough that minimal power is drawn from the piezoelectric device 422. The tap circuit 450 further comprises amplifier 460 (U1A) which converts the voltage signal as sensed by tap circuit 450 to a low impedance for signal processing. A low bias current amplifier like the OPA404 (ipa) or LF347 is suitable for amplifier 460.

The output of amplifier 460 is passed to the next stage, e.g., current direction detector 452. The current direction detector 452 comprises capacitor 462 (C1), resistor R4, and comparator 464 (U1B). Capacitor 462 (C1) senses which direction current is flowing through resistor R5 of FIG. 6. That is, the current direction detector 452 detects when the voltage across piezoelectric device 422 is a maximum or a minimum by sensing when the current falls to zero, with comparator 464 (U1B) operating as a comparator.

The pulse forming circuit 454 comprises two monostable multivibrators 466A and 466B (U2). Each state transition, to maximum or minimum as detected by comparator 464 (U1B) of current direction detector 452, triggers one of the two monostable multivibrators 466A, 466B of pulse forming circuit 454. Triggering of one of the monostable multivibrators 466A, 466B eventually energize a respective one of the two switches 434A, 434B (MOSFETS Q1 and Q2) for a fixed pulse. Since the two switches 434A, 434B (MOSFETS Q1 and Q2) float, respective opto-isolator 468A (U3) and opto-isolator 468A (U4) as powered by power supply 470 (PS2) comprise level shifted gate drive circuitry 456 and level-shift the gate drive to the respective two switches 434A, 434B (MOSFETS Q1 and Q2).

Each of two switches 434A, 434B (MOSFETS Q1 and Q2) have intrinsic body diodes, shown as diode 482A and diode 482B in FIG. 6. The intrinsic body diodes 482 of the MOSFETS 434 are used to conduct in one direction when the other MOSFET is turned on. That is, intrinsic body diode 482B of switch 434B conducts when switch 434A is on; intrinsic body diode 482A of switch 434A conducts when switch 434B is on.

When opto-isolator 468A (U3) is activated by reason of, e.g., a voltage maximum as indicated by a pulse from monostable multivibrator 466A, the gate 484A (U5A) turns on the upper switch 434A. Current then starts to flow from the piezoelectric device 422, through inductor L1, through the upper switch 434A (Q1), and through the parasitic body diode 482B of the lower switch 434B (Q2) into capacitor charge storage device 424 (C4). With a suitable inductor inductance L1, this dump from the piezoelectric device 422 to charge storage device 424 (C4) is rapid compared to the excitation frequency.

Similarly, a negative peak on the piezoelectric device 422 charges charge storage device 424 (C4) negatively by activating switch 434B (Q2). That is, when opto-isolator 468B (U4) is activated by reason of, e.g., a voltage maximum as indicated by a pulse from monostable multivibrator 466B, the gate 484B (U5B) turns on the lower switch 434B (Q2). Current then starts to flow from the piezoelectric device 422, through inductor L1, through the parasitic body diode 482A of the upper switch 434A (Q1), through the lower switch 434B (Q1), and into capacitor charge storage device 424 (C4).

The inductor L1 can be a radio frequency (RF) choke as might be used in a short wave radio. Yet as mentioned above, various values of inductance L1 can be used, depending, e.g., on aspects of the circuit and other parameters.

The energy harvesting circuit 420 of FIG. 6 provides a significant regenerative effect since, among other things, it pumps up the voltage in piezoelectric device 422 and thereby provides greater leverage in energy harvesting. In the energy harvesting circuit 420 of FIG. 6, the capacitances include the capacitance C-RLP of piezoelectric device 422 and the capacitance C4 associated with the charge storage device 424. Preferably capacitance C4 is larger than the capacitance C-RLP, e.g., preferably (for example) ten times as large as capacitance C-RLP. The ratio of these two capacitances affects the energy regenerative effect.

After the switch (e.g., switch 434A) is energized at the voltage peak of piezoelectric device 422, the voltage in capacitance C-RLP first decreases to zero, and then decreases to negative its original value. At this point the capacitance C-RLP has negative voltage, which occurs almost instantaneously. As the piezoelectric device 422 continues to move, piezoelectric device 422 adds the aliquot of voltage that it normally would do. In other words, the charge storage device 424 had reached a voltage peak because it was compressed, but then as it expands the piezoelectric device 422 will have a negative voltage. This negative voltage caused by expansion of piezoelectric device 422 adds to the negative voltage just produced on capacitance C-RLP. This action repeats and allows a building up to a steady state value where the voltage on capacitance C-RLP of the piezoelectric device 422 is many times the voltage one would get during one compression cycle. The energy harvesting circuit 420 of FIG. 6 thus allows the pumping up of the piezoelectric device 422 and a harvesting of the multiplied voltage on the piezoelectric device 422.

In the energy harvesting circuit 420 of FIG. 6 the capacitance C-RLP has a same amount of charge (i.e., a same Δvoltage on the capacitance C-RLP) during each cycle, but that charge goes through a bigger potential difference. This pumping up of the charge in the capacitance C-RLP of piezoelectric device 422 is facilitated by the fact that energy harvesting circuit 420 is able to switch the energy both directions. In order to do so, the force driving the vibration on the piezoelectric device 422 must have sufficient force capability to do the extra work that is required. Pumping up the voltage in the piezoelectric device 422, by getting it swinging to large values, requires sufficient force, but may have the same displacement. The increased (e.g., leveraged) charge on capacitance C-RLP is harvested by energy harvesting circuit 420 in the manner already described.

In an example implementation of energy harvesting circuit 420 wherein there is a capacitance ratio of 10:1 (ratio of capacitance C4 to capacitance C-RLP), there can be a significant energy increase, theoretically as high as 100:1.

Devices such as the foregoing are essentially energy extractors because they extract more energy than is freely available from the piezoelectric device. FIG. 7 shows a simple energy extractor which extracts energy from a piezoelectric energy source PZT. The energy extractor of FIG. 7 comprises inductance L; switches S1 and S2, diodes D1 and D2, and capacitance C2.

The operation of the circuit of FIG. 7 is fundamentally intermittent. The excitation of the piezoelectric energy source PZT, typically from a vibration source, will give rise to a signal across C1 which may be of (1) constant amplitude and frequency or (2) variable frequency and amplitude. Even a variable frequency and amplitude signal will be band limited and continuous. The frequency content will range from very low to a high of perhaps 250 Hz when the vibration source is a common carrier or piece of industrial equipment. In either case, the signal will have maxima and minima with a typical and minimum interval between these maxima and minima.

The energy extractor takes the energy stored in C1 at these maxima and minima and transfers it to a second capacitor, C2, in a time significantly less than the time between peaks. Energy thus transferred to C2 is removed to an end-use prior to the next peak so that the circuit is restored to its original state, ready to harvest another aliquot of energy.

When the voltage across C1 has just reached a maximum and C2 is discharged, switch S1 closes at this instant and a voltage is applied across inductor L. The applied voltage causes a current to build in the inductor which will flow into capacitor C2 until the current is stopped by the increasing potential on C2 relative to C1. For instance, if C2 is equal to C1, the voltage across C1 will decrease at the same rate as the voltage across C2 increases. The current will reach a maximum when C1 and C2 are at the same potential, and the current will drop to zero when C2 is at the initial voltage on C1 at which time C1 is fully discharged to zero. The switch is then open circuited, for if it were not, the charge would flow from C2 back to C1. The switch has the function of preventing discharge until the peak voltage is reached as well as shutting off when the current tries to reverse. The purpose of the diode D1 is to keep the current from reversing without actually having to open the switch at the precise instant the current reaches zero. For this example, it is clear that all the energy from C1 resides in C2 after the switch closure event. This is in contrast to energy harvesting without the inductor in which both capacitors are at the same potential after the switch event, namely half of the original voltage. In this inductorless case, each capacitor has 25% of the energy after the switch event and 50% is dissipated. Hence, the inductor quadruples the amount of energy harvested while only removing 25% more energy from the vibrations.

In various embodiments described herein a bidirectional switch can be utilized. FIG. 8A-FIG. 8C show various example embodiments of bi-directional switches which comprise diodes; FIG. 8D shows an example embodiment of a bi-directional switch which comprises N channel MOSFETs.

Switches such as those shown in FIG. 8A-FIG. 8B can be utilized in energy extractors. Three simple topologies are shown with reference to FIG. 7, FIG. 9, and FIG. 10. FIG. 9 shows a circuit with a diode bridge on output to collection capacitor. FIG. 10 shows a circuit with diode bridge feeding the inductor. Yet another possibility is to use two collection capacitors and two unidirectional collection switches is a combination of the topologies shown in FIG. 7 and FIG. 10. Other possible variations will be apparent to one skilled in the art. For instance, the inductor can be on either side of the switch, the switch can be implemented in other semiconductor types such as p channel MOSFETS and thyristors.

The circuit of FIG. 9 has the advantage that once charged, C3 is not discharged by subsequent switching actions. The circuit of FIG. 10 has the advantage that only a unidirectional switch is required. An SCR could be used which might simplify the drive circuitry. This circuit topology can also be advantageous for charging a battery directly.

The piezoelectric devices described herein can be (by way of non-limiting example) a laminated piezoelectric element known as a ruggedized laminated piezoelectric or RLP®. Such ruggedized laminated piezoelectric elements typically comprise a piezoelectric wafer which is laminated to a stainless steel substrate and preferably also has an aluminum cover laminated thereover. Examples of such ruggedized laminated piezoelectric elements are illustrated and described in one or more of the following: PCT WO 2002/022358; U.S. Pat. No. 7,292,503, entitled "Piezoelectric Actuator and Pump Using Same"; U.S. Pat. No. 6,777,427, entitled "Piezoelectric Actuator and Pump Using Same", and United States Publication 2006/0232171, entitled "PIEZOELECTRIC DIAPHRAGM ASSEMBLY WITH CONDUCTORS ON FLEXIBLE FILM", all of which are incorporated herein by reference.

Various embodiments described herein employ a field effect transistor (FET). If FET output is too fast and/or the transconductance is too great, unstable waveforms may result in the peak detection circuit. As a modification, the output can be replaced by a sensitive gate SCR (silicon controller rectifier) if desired. Moreover, it is also possible in other example embodiments to replace a SCR with a pair of transistors, as the lower holding current of the transistor pair can result in greater efficiency of the circuit.

It will be appreciated that the circuits described herein are not limited to the particular features shown, and that other additional features or circuits can be used in conjunction therewith or in lieu thereof. For example, for embodiments in which the charge storage device is a battery, a protection circuit may also be provided to prevent overcharging or discharging of the battery.

In some of its aspects the technology disclosed herein provides a self-powered active energy collection circuit that can be powered by a piezogenerator, thus not requiring an external power source. Various example embodiments of the technology disclosed herein also encompass features such as the following: (1) extracting power only at a peak in the voltage output of the piezogenerator; (2) provision of a simple, low power peak detector; (3) the use of low leakage diodes to rectify the output of the piezogenerator, thus reducing losses.

Possible uses for the technology disclosed herein include use as an energy capture circuit for use in an energy harvesting device. The use of this circuit is not limited to piezoelectric energy harvesting and can be useful for other energy harvesting generators as well such as an electromagnetic device.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A circuit for applying electrical charge collected from a piezoelectric device to a charge storage device, the circuit comprising:
    a switch configured to initiate transfer of the electrical charge from the piezoelectric device to the charge storage device upon detection of a peak voltage across the piezoelectric device;
    a peak detector configured to detect the peak voltage across the piezoelectric device, the peak detector comprising:
        a peak-detection capacitance configured to be charged by voltage across the piezoelectric device until the voltage across the piezoelectric device reaches the peak voltage across the piezoelectric device;
        a non-linear PN junction circuit connected in series with the peak-detection capacitance and configured to turn off the switch while the peak-detection capacitance is charging and to turn on the switch substantially upon detection of the peak voltage.

2. The circuit of claim 1, wherein the peak detector further comprises a gain element configured to turn off the switch while the peak-detection capacitance is charging, and wherein the non-linear PN junction circuit is configured to turn off the gain element and thereby turn off the switch while the peak-detection capacitance is charging and is configured to turn on the gain element and thereby turn on the switch substantially upon detection of the peak voltage.

3. The circuit of claim 2, wherein the gain element comprises one of a field effect transistor and an operational amplifier.

4. The circuit of claim 1, the peak-detection capacitance has a value in a range from 50 picoFarads to 200 picoFarads.

5. The circuit of claim 1, wherein the non-linear PN junction circuit comprises a first diode connected in parallel with a second diode, and wherein the first diode has a positive voltage thereacross when the peak-detection capacitance is charging for turning off the switch, and wherein the second diode is configured to turn on the switch when the peak-detection capacitance is discharging.

6. The circuit of claim 1, wherein the switch comprises a field effect transistor connected to the charge storage device.

7. The circuit of claim 6, wherein the switch comprises a flip-flop connected to the field effect transistor.

8. The circuit of claim 1, wherein the switch comprises an optical TRIAC connected to the charge storage device.

9. The circuit of claim 1, wherein the switch comprises a silicon controlled rectifier (SCR) connected to the charge storage device.

10. The circuit of claim 1, further comprising a tap circuit configured to extract a portion of voltage across the piezoelectric device to operate at least one of the peak detector and the switch.

11. The circuit of claim 1, further comprising a rectifier connected to the piezoelectric device and configured to provide a single polarity voltage as the voltage across the piezoelectric device.

12. A circuit for applying electrical charge collected from a piezoelectric device to a charge storage device, the circuit comprising:
    a peak detector configured to detect a peak voltage across the piezoelectric device;
    a switch configured to initiate transfer of the electrical charge from the piezoelectric device to the charge storage device upon detection of the peak voltage across the piezoelectric device;
    a charge multiplier circuit configured to continue application of the electrical charge to the charge storage device after the switch has been turned off and/or after a point in time when magnitude of the voltage across the charge storage device equals the magnitude of the voltage across the piezoelectric device.

13. The circuit of claim 12, wherein the charge multiplier circuit comprises a switched inductance connected in series with the charge storage device.

14. The circuit of claim 12, wherein the charge multiplier circuit is configured whereby electrical charge stored by the charge storage device is a multiple by a factor M of the peak voltage across the piezoelectric device, wherein M is substantially a ratio of the peak voltage across the piezoelectric device to the voltage across the charge storage device at the time of the peak voltage across the piezoelectric device.

15. The circuit of claim 12, wherein the peak detector further comprises:
    a peak-detection capacitance configured to be charged by voltage across the piezoelectric device until the voltage across the piezoelectric device reaches the peak voltage across the piezoelectric device;
    a non-linear PN junction circuit connected in series with the peak-detection capacitance and configured to turn off the switch while the peak-detection capacitance is charging and to turn on the switch substantially upon detection of the peak voltage.

16. The circuit of claim 15, the peak-detection capacitance has a value in a range from 50 picoFarads to 200 picoFarads.

17. The circuit of claim 15, wherein the non-linear PN junction circuit comprises a first diode connected in parallel with a second diode, and wherein the first diode has a positive voltage thereacross when the peak-detection capacitance is charging for turning off the switch, and wherein the second diode is configured to turn on the switch when the peak-detection capacitance is discharging.

18. The circuit of claim 15, wherein the switch comprises one of a field effect transistor connected to the charge storage device; an optical TRIAC connected to the charge storage device; a silicon controlled rectifier (SCR) connected to the charge storage device; and a pair of transistors connected as a silicon controlled rectifier and connected to the charge storage device.

19. The circuit of claim 12, further comprising a tap circuit configured to extract a portion of voltage across the piezoelectric device to operate at least one of the peak detector and the switch.

20. The circuit of claim 12, further comprising a rectifier connected to the piezoelectric device and configured to provide a single polarity voltage as the voltage across the piezoelectric device.

21. A circuit for applying electrical charge collected from a piezoelectric device to an energy storage device, the circuit being configured both (1) to provide bidirectional control of energy flow for causing charge on the piezoelectric device to go through an increased potential difference and thereby provide increased voltage on the piezoelectric device, and (2) to collect the increased charge from the piezoelectric device in the energy storage device;

wherein the circuit comprises:

a detector configured to detect both a positive peak voltage and a negative voltage peak across the piezoelectric device; and switching means configured to initiate transfer of the electrical charge from the piezoelectric device to the energy storage device upon detection of the positive peak voltage across the piezoelectric device, and to initiate transfer of the electrical charge from the piezoelectric device to the energy storage device upon detection of the negative peak voltage across the piezoelectric device.

* * * * *